(12) United States Patent
Faruque et al.

(10) Patent No.: US 10,144,381 B2
(45) Date of Patent: Dec. 4, 2018

(54) VEHICLE IMPACT ENERGY ABSORBER INCLUDING INFLATABLE WEBBING

(71) Applicant: Ford Global Technologies, LLC, Dearborn, MI (US)

(72) Inventors: Mohammed Omar Faruque, Ann Arbor, MI (US); Dean M. Jaradi, Macomb, MI (US); S.M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 69 days.

(21) Appl. No.: 15/397,058

(22) Filed: Jan. 3, 2017

(65) Prior Publication Data

US 2018/0186324 A1 Jul. 5, 2018

(51) Int. Cl.
| | |
|---|---|
| B60R 21/18 | (2006.01) |
| B60R 21/261 | (2011.01) |
| B60N 2/14 | (2006.01) |
| B60R 22/12 | (2006.01) |
| B60R 22/14 | (2006.01) |
| B60R 22/36 | (2006.01) |
| B60R 22/46 | (2006.01) |
| B60N 2/02 | (2006.01) |
| B60R 21/2338 | (2011.01) |

(52) U.S. Cl.
CPC .............. *B60R 21/18* (2013.01); *B60N 2/143* (2013.01); *B60R 21/261* (2013.01); *B60R 22/12* (2013.01); *B60R 22/14* (2013.01); *B60R 22/36* (2013.01); *B60R 22/46* (2013.01); *B60N 2002/022* (2013.01); *B60R 2021/23386* (2013.01); *B60R 2021/2612* (2013.01)

(58) Field of Classification Search
CPC ............ B60R 21/18; B60R 2021/0044; B60R 2021/0048; B60R 2021/0055; B60R 2021/0058; B60R 2021/2612; B60R 2021/23386; B60R 22/12; B60R 22/14; B60R 22/26; B60R 22/36; B60R 22/46; B60R 2022/027; B60R 21/261; B60N 2/143; B60N 2002/022
See application file for complete search history.

(56) References Cited

U.S. PATENT DOCUMENTS

| | | | | |
|---|---|---|---|---|
| 3,791,670 | A * | 2/1974 | Lucore | B60R 21/18 280/733 |
| 3,905,615 | A * | 9/1975 | Schulman | B60R 21/18 244/122 B |
| 4,468,051 | A * | 8/1984 | Kobayashi | B60N 2/143 280/751 |

(Continued)

FOREIGN PATENT DOCUMENTS

| | | | |
|---|---|---|---|
| DE | 4306528 A1 * | 9/1994 | ............. B60R 21/18 |
| DE | 4431658 A1 | 3/1996 | |

(Continued)

*Primary Examiner* — Laura Freedman
(74) *Attorney, Agent, or Firm* — Frank A. MacKenzie; Bejin Bieneman PLC (57) ABSTRACT

A system includes an airbag, a seat, a strap, and an inflatable webbing. The airbag is inflatable to an inflated position. The seat includes a seat back. The strap has a first end connected the airbag and a second end connected to the seat back. The inflatable webbing is fluidly connected to the airbag and releasably connectable to the seat back.

20 Claims, 6 Drawing Sheets

(56) References Cited

U.S. PATENT DOCUMENTS

| | | | | |
|---|---|---|---|---|
| 5,445,411 A * | 8/1995 | Kamiyama | ......... | A44B 11/2523 280/733 |
| 5,465,999 A * | 11/1995 | Tanaka | ................ | A44B 11/2523 280/733 |
| 5,839,753 A * | 11/1998 | Yaniv | ....................... | B60R 21/18 280/733 |
| 5,851,055 A * | 12/1998 | Lewis | ..................... | B60R 21/18 297/483 |
| 6,237,945 B1 * | 5/2001 | Aboud | .................... | B60R 21/18 280/730.2 |
| 6,293,582 B1 | 9/2001 | Lewis | | |
| 6,336,657 B1 * | 1/2002 | Akaba | ..................... | B60R 21/18 280/733 |
| 6,705,641 B2 * | 3/2004 | Schneider | ............... | B60R 21/18 280/733 |
| 6,820,902 B2 * | 11/2004 | Kim | ...................... | A41D 13/018 280/748 |
| 8,016,318 B2 * | 9/2011 | Nezaki | ................... | B60N 2/002 280/733 |
| 8,038,170 B2 * | 10/2011 | Haraoka | ................. | B60R 21/18 244/122 AG |
| 8,066,303 B2 * | 11/2011 | Nezaki | ................... | B60R 21/18 280/806 |
| 8,308,190 B2 | 11/2012 | Smith et al. | | |
| 8,448,983 B2 * | 5/2013 | Fukawatase | ............ | B60R 21/18 280/733 |
| 9,725,064 B1 * | 8/2017 | Faruque | ................. | B60N 2/143 |
| 9,744,932 B1 * | 8/2017 | Faruque | ................. | B60R 21/16 |
| 9,744,933 B1 * | 8/2017 | Rao | ................... | B60R 21/01554 |
| 9,745,065 B2 * | 8/2017 | Santana-Gallego | ........................ | B64D 11/0621 |
| 9,758,127 B1 * | 9/2017 | Farooq | .................... | B60R 22/26 |
| 9,789,840 B2 * | 10/2017 | Farooq | .................... | B60N 2/14 |
| 9,902,362 B2 * | 2/2018 | Farooq | ................. | B60R 21/214 |
| 2016/0272141 A1 * | 9/2016 | Ohmura | ........... | B60R 21/01554 |
| 2016/0280171 A1 * | 9/2016 | Moeller | ................. | B60R 21/18 |
| 2017/0225788 A1 * | 8/2017 | Humbert | ........... | B64D 11/0621 |

FOREIGN PATENT DOCUMENTS

| | | | | |
|---|---|---|---|---|
| DE | 19630561 A1 | 1/1997 | | |
| DE | 102004024548 A1 | 12/2005 | | |
| DE | 102014214396 A1 | 1/2016 | | |
| EP | 1110823 A1 * | 6/2001 | ............. | B60R 21/18 |
| JP | 2003312439 A * | 11/2003 | | |
| JP | 2004098753 A * | 4/2004 | | |
| JP | 4986808 B2 | 5/2012 | | |
| JP | 2017170941 A * | 9/2017 | ....... | B60R 21/01544 |

* cited by examiner

FIG. 9

VEHICLE IMPACT ENERGY ABSORBER INCLUDING INFLATABLE WEBBING

BACKGROUND

An interior of a vehicle, such as an automobile, may include a plurality of safety systems to absorb energy from an occupant during a vehicle impact. For example, the vehicle may include a seat belt attached to a seat and to a vehicle pillar. The vehicle may further include one or more airbags that expand from an instrument panel, a vehicle roof, a vehicle door, etc. The seat belt and the airbags may be configured to absorb energy and soften impact between the body of the occupant and the instrument panel or the door.

In an autonomous vehicle, the occupant may face away from a vehicle-forward direction. Furthermore, when more than one occupant is in the vehicle, each occupant may face a different direction. During the vehicle impact, each occupant may move in a direction dependent on the direction each occupant faced prior to the impact and the direction of the force applied by the vehicle impact. There remains an opportunity to design an energy absorber for the autonomous vehicle when the occupants face differing directions.

DETAILED DESCRIPTION

With reference to the Figures, wherein like numerals indicate like parts throughout the several views, an energy absorbing system 10 comprises an airbag 16 inflatable to an inflated position, a seat 14 including a seat back 22, a strap 18 having a first end 24 connected to the airbag 16 and a second end 26 connected to the seat back 22, and an inflatable webbing 20 fluidly connected to the airbag 16 and releasably connectable to the seat back 22.

Because the airbag 16 is connected to the seat 14, the airbag 16 can absorb impact energy from an occupant when the seat 14 is rotated to face any direction within the vehicle 12, i.e., when rotated about a generally vertical axis. Furthermore, the airbag 16, the strap 18, and the inflatable webbing 20 secure the occupant to the seat 14. Thus, the seat 14 can include more than one self-contained impact-absorbing devices (e.g., the airbag 16, the strap 18, the inflatable webbing 20) for the occupant. During the vehicle impact, regardless of the direction that the occupant faces, the energy absorbing system may absorb impact energy from the occupant.

Figure 1:
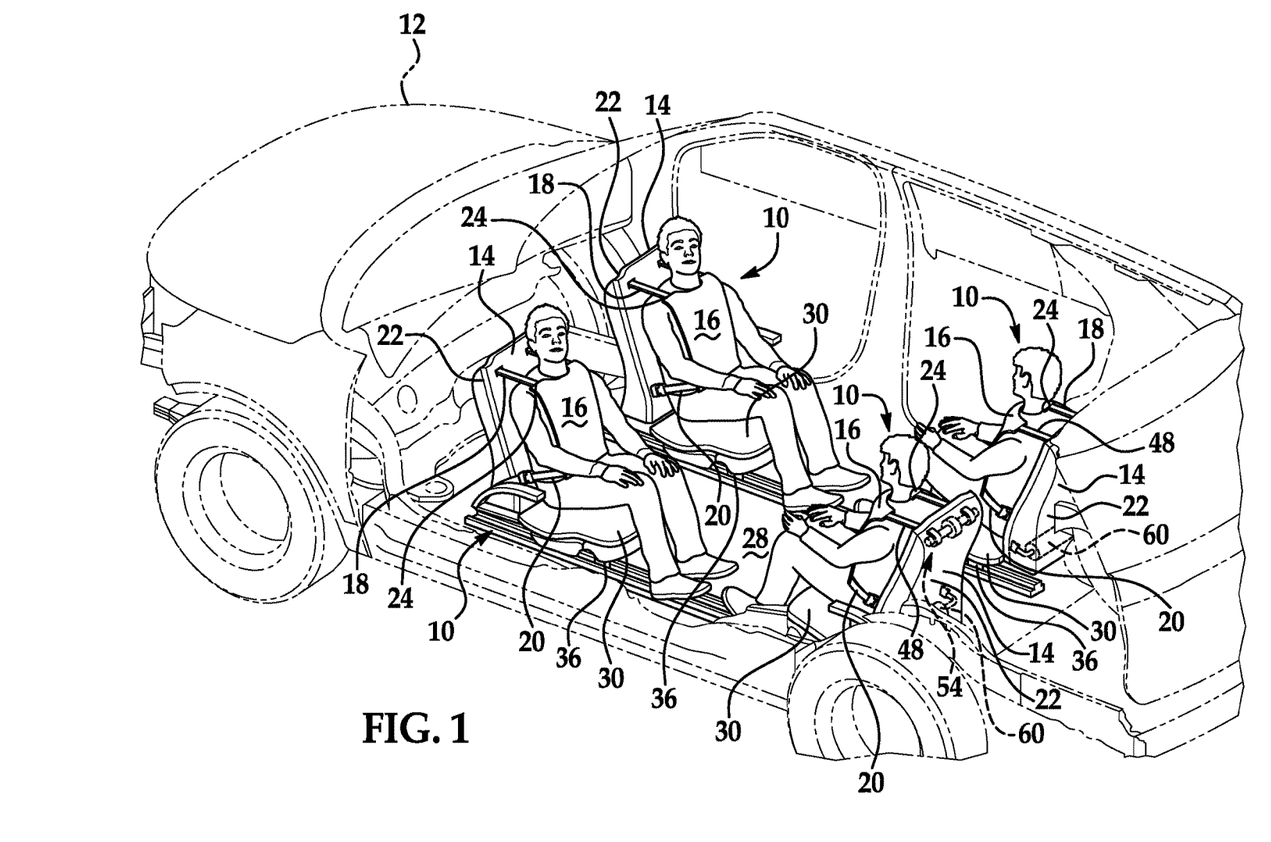
FIG. 1 is a perspective view of a vehicle with a plurality of seats and a plurality of airbags each in an uninflated position.
Figure 2:
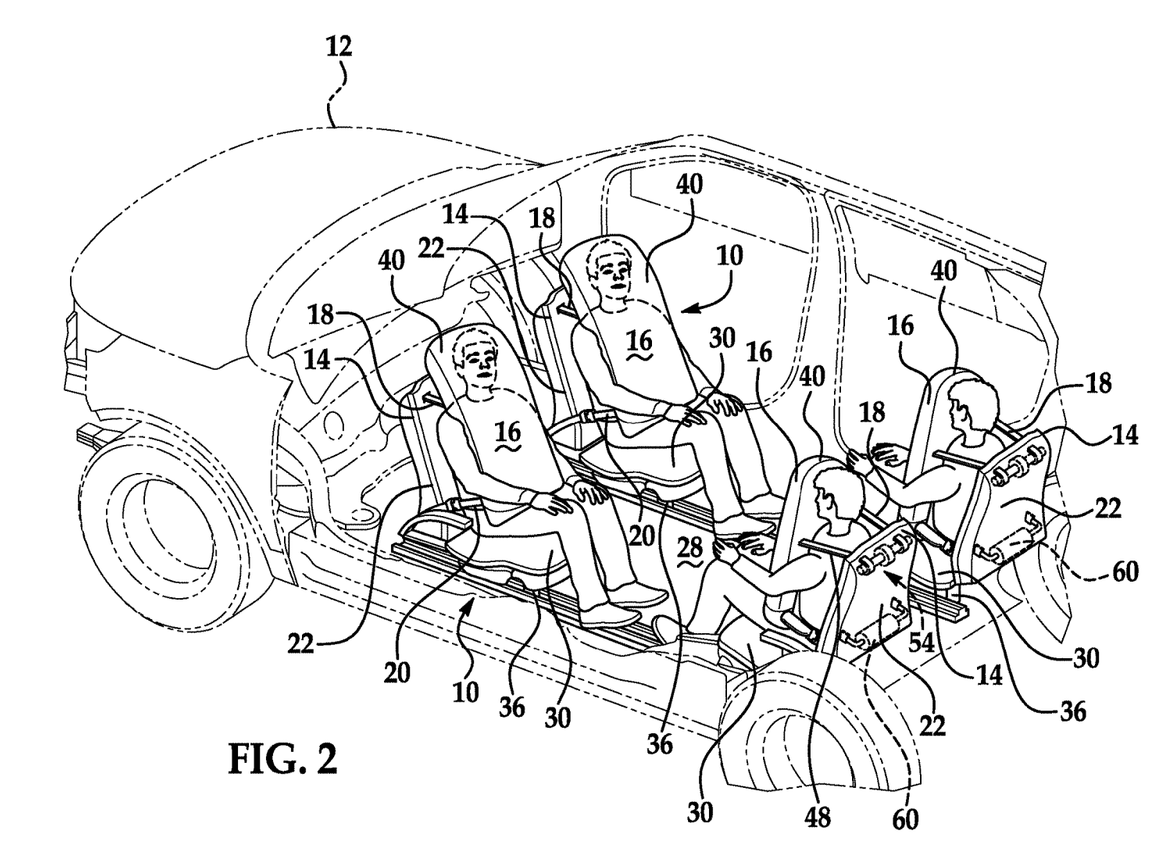
FIG. 2 is a perspective view of the vehicle with the plurality of airbags each in an inflated position.

The vehicle 12 may include a vehicle floor 28, as shown in FIGS. 1-2. The vehicle floor 28 may support a plurality of the seats 14. For example, FIGS. 1-2 show four seats 14 supported by the vehicle floor 28. The vehicle floor 28 may further support a lower body of the occupant.

Figure 3:
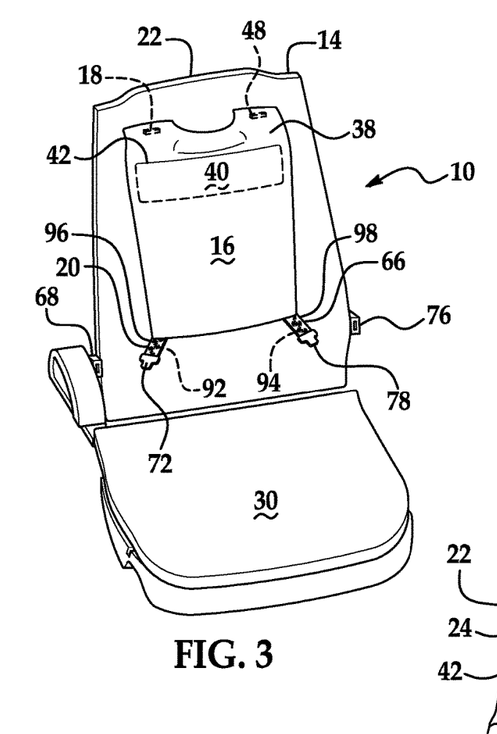
FIG. 3 is a view of one of the plurality of seats with one of the airbags in the uninflated position.
Figure 4:
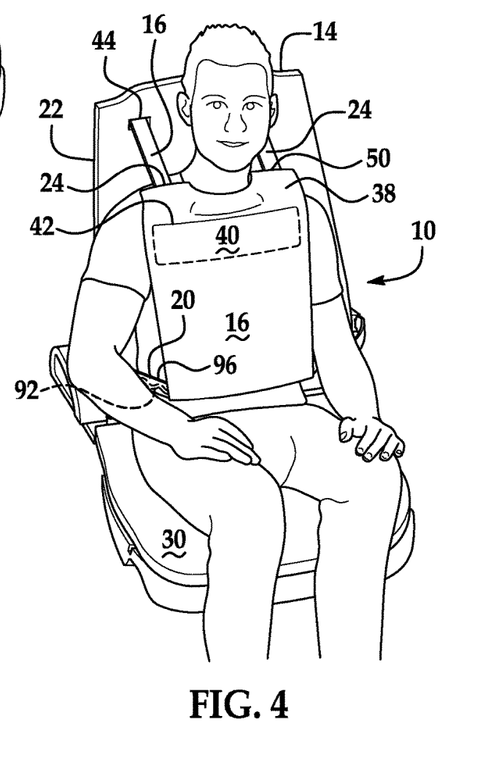
FIG. 4 is a view of one of the seats with an occupant and using the airbag.
Figure 5:
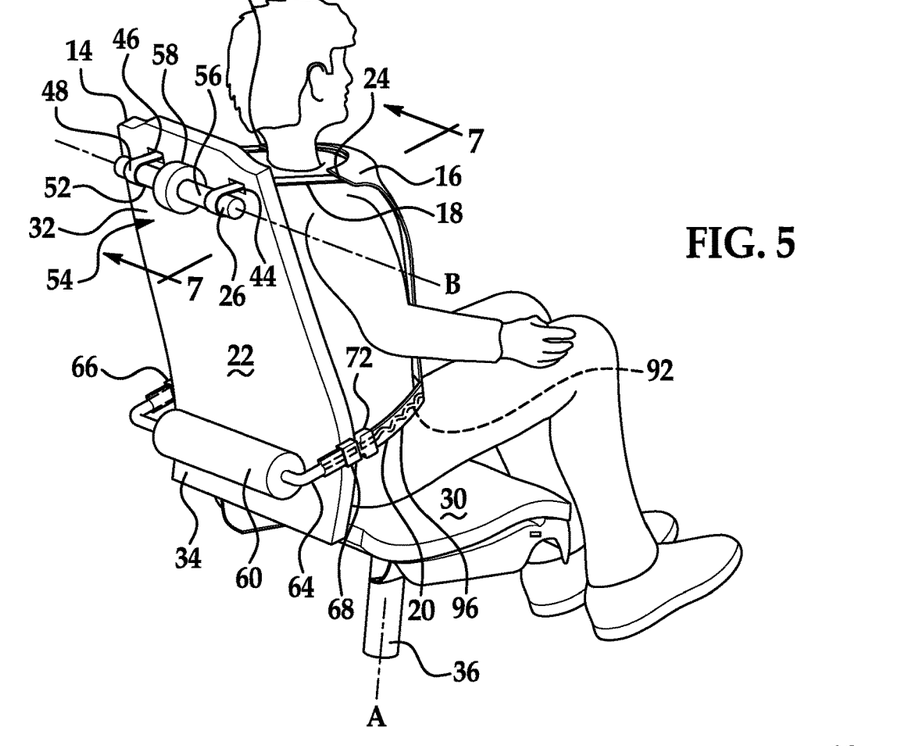
FIG. 5 is a rear perspective view of the seat with an inflatable webbing attached to the airbag and to an inflator.
Figure 6:
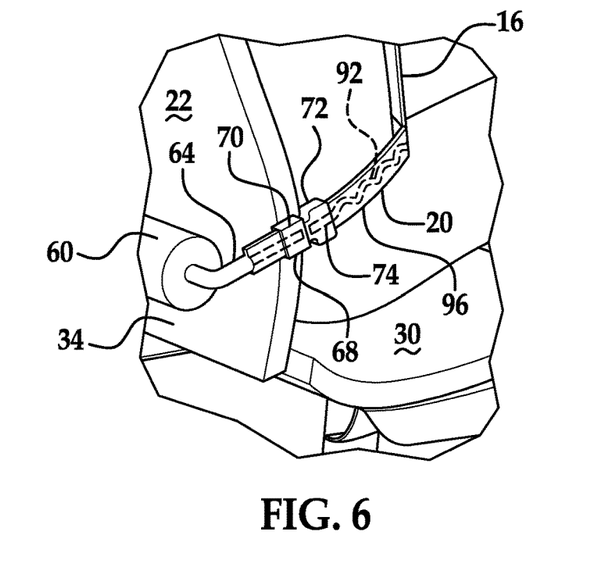
FIG. 6 is a magnified view of the inflatable webbing including a tongue attached to a buckle.

The energy absorbing system 10 includes the seat 14, as shown in FIGS. 1-8. Each seat 14 includes the seat back 22 and a seat bottom 30, as shown in FIGS. 1-6 and 8. The seat back 22 may be rotatably connected to the seat bottom 30, i.e., the seat back 22 may recline relative to the seat bottom 30. The seat back 22 and the seat bottom 30 support the occupant. The seat back 22 may have an upper portion 32 and a lower portion 34, as shown in FIGS. 5 and 6. The strap 18 may be connected to the upper portion 32. The inflatable webbing 20 may be connected to the lower portion 34.

Figures 7, 8:
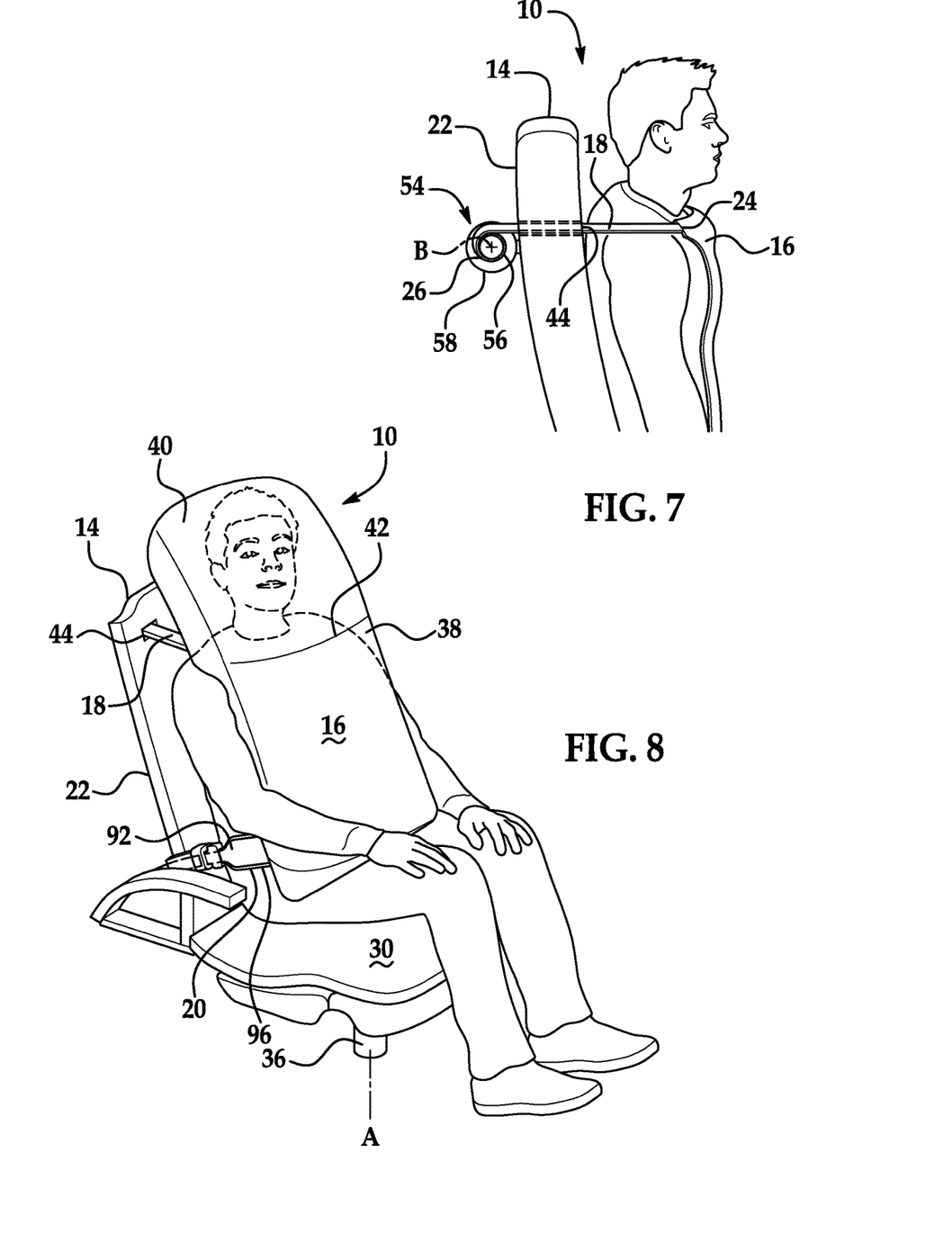
FIG. 7 is a side view of the seat illustrating a seat back and a strap connecting the airbag to a retractor.
FIG. 8 is a view of the seat with the airbag in the inflated position.

As set forth above, the seat 14 may be rotatable relative to the vehicle floor 28 to face various directions, i.e., is rotatable about a generally vertical axis. For example, the seat 14 may include a shaft 36, as shown in FIGS. 1-2, 5, and 8. The shaft 36 may extend from the seat bottom 30 to the vehicle floor 28, as shown in FIGS. 1-2. The shaft 36 may secure the seat bottom 30 vertically. The seat bottom 30 may be rotatable relative to the vehicle floor 28 about the shaft 36 along a shaft axis A, as shown in FIGS. 5 and 8. By rotating about the shaft 36, the occupant may rotate to a preferred angle to face, e.g., one of the other seats 14, as shown in FIGS. 1-2. Furthermore, the airbag 16 may absorb impact energy when the seat 14 faces a direction other than the vehicle-forward direction. The shaft 36 may include one or more devices (not shown) that allow the seat bottom 30 to rotate, e.g., a bearing, a gear, etc. Alternatively, the seat 14 may be rotatable relative to the vehicle floor 28 in any suitable fashion.

The energy absorbing system 10 includes the airbag 16, as shown in FIGS. 1-8. The airbag 16 is inflatable from an uninflated position, as shown in FIGS. 1 and 3-7 to the inflated position, as shown in FIGS. 2 and 8. The airbag 16 may be positioned on the occupant's upper body. When the airbag 16 is in the inflated position, the airbag 16 may absorb impact energy from the occupant.

The airbag 16 may be formed of any suitable material, for example, a woven polymer. For example, the airbag 16 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 16 may include an upper end 38, as shown in FIGS. 3-4 and 8. The upper end 38 of the airbag 16 may include a head extension 40. The head extension 40 may be folded in an interior of the airbag 16 when the airbag 16 is in the uninflated position. When the airbag 16 inflates, the head extension 40 may extend from a seam 42 in the upper end 38 over an upper body of the occupant, e.g., a head and neck of the occupant, as shown in FIGS. 2 and 8. By storing the head extension 40 in the interior of the airbag 16 in the uninflated position, the occupant can place the airbag 16 onto the occupant's upper body without covering the occupant's head. Then, during the impact, the head extension 40 can absorb impact energy from the occupant's head and neck.

The upper portion 32 of the seat back 22 may define a slot 44, as shown in FIGS. 4-5 and 7-8. The slot 44 extends through the seat back 22. The strap 18 may extend from the airbag 16 through the slot 44 to the seat back 22. The upper portion 32 may define a second slot 46, as shown in FIG. 5.

The seat 14 may include a second strap 48, as shown in FIGS. 1-5, that extends from the upper portion 32 to the airbag 16 through the second slot 46. The second strap 48 may have a first end 50 connected to the airbag 16 and a second end 52 connected to the seat back 22 through the second slot 46. By extending through the slot 44 and the second slot 46, the strap 18 and the second strap 48 may extend to the airbag 16 without extending over the upper portion 32 of the seat back 22. Thus, the amount of the strap 18 and the second strap 48 between the seat back 22 and the airbag 16 may be shorter.

The energy absorbing system 10 includes the strap 18 and the second strap 48, as shown in FIGS. 1-5. The strap 18 and the second strap 48 may connect the airbag 16 (at the respective first ends 24, 50) to the seat back 22 (at the respective second ends 26, 52). For example, the first end 24 of the strap 18 and the first end 50 of the second strap 48 may each be sewn to the airbag 16. The strap 18 and the second strap 48 may secure the airbag 16 to the seat 14 while allowing the occupant to pull the airbag 16 over the occupant's head and onto the occupant's upper body. As described above and shown in FIG. 5, the strap 18 and the second strap 48 may extend from the seat back 22 through the slot 44 and the second slot 46 to the airbag. The strap 18 and the second strap 48 may absorb energy from an upper body of the occupant during the vehicle impact. The strap 18 and the second strap 48 may be constructed of, e.g., a fabric, an elastic polymer, etc.

The energy absorbing system 10 may include a retractor 54, as shown in FIGS. 1-2, 5, and 7. The retractor 54 may be disposed on the upper portion 32 of the seat back 22. The retractor 54 connects the strap 18 and the second strap 48 to the seat back 22, i.e., the strap 18 and the second strap 48 may connect the airbag 16 to the seat back 22 indirectly by the retractor 54.

The retractor 54 may include a retractor shaft 56 rotatable about a retractor axis B. The second ends 26, 52 of the strap 18 and the second strap 48 may be attached to the retractor shaft 56, as shown in FIG. 5, connecting the strap 18 and the second strap 48 to the seat back 22 via the retractor 54. Thus, when the occupant pulls the airbag 16, the strap 18 and the second strap 48 may rotate the retractor shaft 56, unspooling the strap 18 and the second strap 48 from the retractor shaft 56. When the occupant leaves the seat 14, the retractor shaft 56 may rotate to spool the strap 18 and the second strap 48 back onto the retractor shaft 56. Thus, the strap 18 and the second strap 48 may be stowed when the occupant is not in the seat 14 and may extend when the occupant pulls the airbag 16 onto the occupant's upper body.

The retractor 54 may include a locking mechanism 58, as shown in FIGS. 5 and 7. The locking mechanism 58 may be movable to a locked position. In the locked position, the locking mechanism 58 prevents rotation of the retractor shaft 56. That is, in the locked position, the locking mechanism 58 prevents payout of the strap 18 and second strap 48, locking the airbag 16 in place. As a result, in the vehicle impact, the strap 18 and the second strap 48 may absorb the impact energy from the occupant moving into the airbag 16. The locking mechanism 58, as one example, may be of the type known in the art.

The locking mechanism 58 may be, e.g., an inertia-based device such as a cam, a linear retractor, a skip-lock, etc. That is, the locking mechanism 58 may be designed to prevent rotation of the retractor shaft 56 when a force applied to the strap 18 exceeds a force threshold, e.g., during the vehicle impact. As a result, the retractor 54 allows payout of the strap 18 and the second strap 48 when the occupant pulls on the airbag 16 and prevents payout of the strap 18 and the second strap 48 during the vehicle impact.

The seat 14 may include an inflator 60 in fluid communication with the inflatable webbing 20, as shown in FIGS. 1-2 and 5-6. Upon receiving a signal from, e.g., a vehicle controller 62 as described below, the inflator 60 may inflate the airbag 16 to the inflated position with an inflatable medium, such as a gas. The inflatable medium travels through a fill tube 64 to the inflatable webbing 20 and into an inflation chamber (not shown) of the airbag 16.

The inflator 60 may be, for example, a pyrotechnic inflator that uses a chemical reaction to drive inflation medium to the airbag. The inflator 60 may be, for example, a cold-gas inflator.

The inflator 60 may be disposed on the lower portion 34 of the seat back 22. The inflator 60 may alternatively be disposed on the seat bottom 30, e.g., on a bottom surface of the seat bottom 30 facing the vehicle floor 28.

The energy absorbing system 10 includes the inflatable webbing 20, as shown in FIGS. 1-6 and 8. The inflatable webbing 20 may be connected to the lower portion 34 of the seat back 22. The inflatable webbing 20 may communicate the inflatable medium from the inflator 60 to the airbag 16. The energy absorbing system 10 may include a second inflatable webbing 66, as shown in FIGS. 3 and 5, connected to the lower portion 34 of the seat back 22. When communicating the inflatable medium, the inflatable webbing 20 may expand, as shown in FIG. 6. In addition to communicating the inflatable medium, the inflatable webbing 20 and the second inflatable webbing 66 may secure the airbag 16 to the occupant and absorb energy during the vehicle impact.

As shown in FIGS. 3-6 and 8, the inflatable webbing 20 may include a webbing tube 92 and a sheath 96. The webbing tube 92 is inflatable from an uninflated position, as shown in FIGS. 3-6, to an inflated position, as shown in FIG. 8. The webbing tube 92 may be folded and disposed in the sheath 96 in the uninflated position, as shown in FIGS. 3-6. When the inflatable medium inflates the webbing tube 92 to the inflated position, the webbing tube 92 may extend from the sheath 96, as shown in FIG. 8. That is, the webbing tube 92 in the inflated position may tear the sheath 96 and at least a portion of the webbing tube 92 may be disposed outside of the sheath 96 in the inflated position. By folding the webbing tube 92 into the sheath 96, the webbing tube 92 may be longer than the sheath 96, allowing the airbag 16 to extend farther from the seat back 22 than the length of the sheath 96. The second inflatable webbing 66 may include a second webbing tube 94 folded and disposed in a second sheath 98, as shown in FIG. 3. In the inflated position, the second webbing tube 94 may extend from the second sheath 98 (not shown).

The seat 14 may include a buckle 68 connected to the seat back 22. The buckle 68 may include a buckle channel 70 fluidly connected to the fill tube 64. The inflatable webbing 20 may include a tongue 72 releasably connectable to the buckle. The tongue 72 may include a tongue channel 74 in communication with the inflatable webbing 20. When the tongue 72 is connected to the buckle 68, the buckle channel 70 is fluidly connected to the tongue channel 74 and to the webbing tube 92. Thus, the inflatable medium may flow through the fill tube 64, the buckle channel 70, the tongue channel 74, and the webbing tube 92 to inflate the airbag 16 to the inflated position. That is, the fill tube 64, the buckle channel 70, the tongue channel 74, and the webbing tube 92 may form a continuous fluid channel from the inflator 60 to the airbag 16 to communicate the inflatable medium. The seat 14 may include a second buckle 76 connectable to a second tongue 78 attached to the second inflatable webbing 66, as shown in FIG. 3. The buckle 68, second buckle 76, inflatable webbing 20, second inflatable webbing 66, strap 18, and second strap 48 secure the airbag 16 to the occupant and the occupant to the seat 14.

When the occupant enters the vehicle 12, the tongue 72 and the second tongue 78 may be disconnected from the buckle 68 and the second buckle 76. The occupant may then pull the airbag 16, unspooling the strap 18 and the second strap 48 from the retractor 54, over the occupant's head. The occupant may then connect the tongue 72 to the buckle 68 and the second tongue 78 to the second buckle 76. Thus, the airbag 16, the strap 18, the second strap 48, the buckle 68, and the second buckle 76 secure the occupant at four points, i.e., form a 4-point harness.

Figure 9:
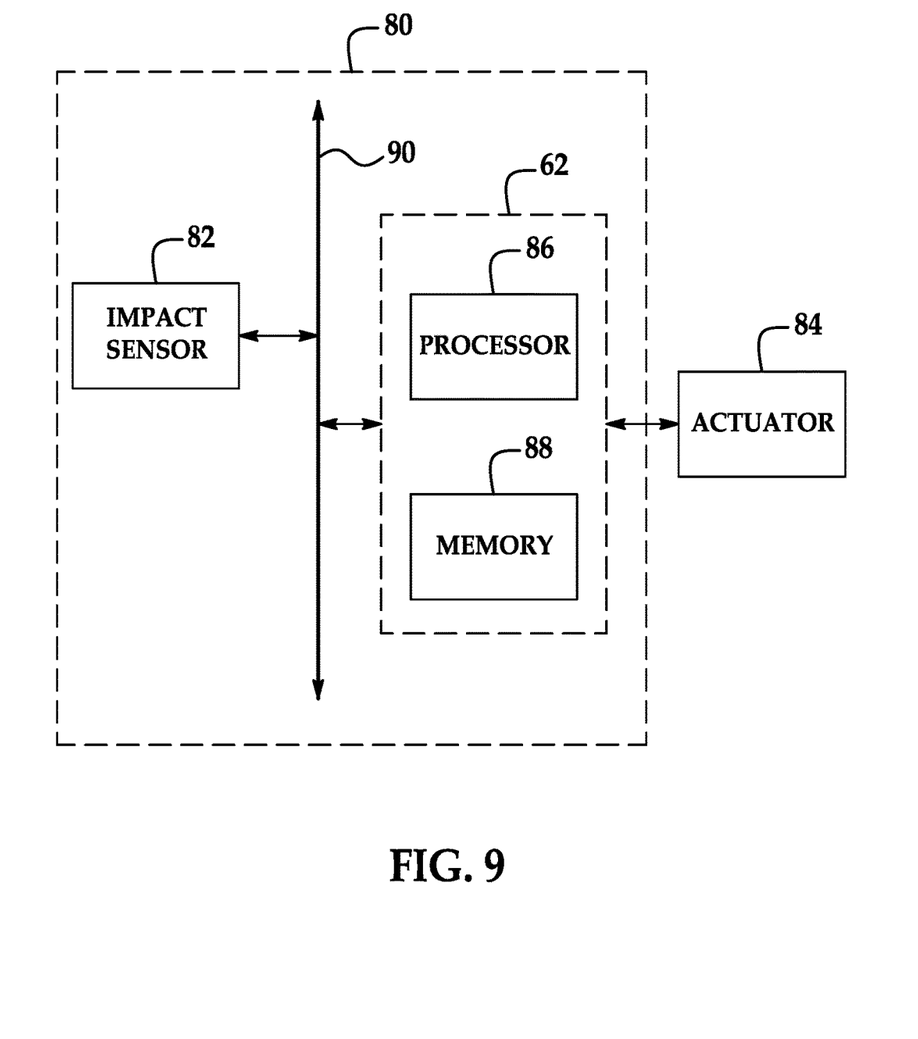
FIG. 9 is a block diagram of an impact sensing system.

With reference to FIG. 9, the vehicle 12 may include an impact sensing system 80. The impact sensing system 80 may include an impact sensor 82 and the controller 62. The controller 62 is in communication with an inflator actuator 84 and may include a processor 86 and a memory 88. The memory 88 stores instructions executable by the processor 86 to control the inflator actuator 84. The controller 62 may be programmed to, upon identification of an impact, cause triggering of the inflator actuator 84, causing the inflator 60 to generate the inflatable medium and inflate the airbag 16.

The impact sensor 82 may be in communication with the controller 62 to communicate data to the controller 62. The impact sensor 82 may be of any suitable type, e.g., using accelerometers, radar, lidar, and/or a vision system. The vision system may include one or more cameras, CCD image sensors, and/or CMOS image sensors, etc. Based on data communicated by the impact sensor 82, the controller 62 may cause triggering of the inflator actuator 84.

To facilitate communications between the controller 62, the impact sensor 82, the inflator actuator 84, and other components in the vehicle 12, may be connected to a communication bus 90, such as a controller area network (CAN) bus, of the vehicle 12. The controller 62 may use information from the communication bus 90 to control the triggering of the inflator actuator 84. The inflator actuator 84 may be connected to the controller 62 or may be connected to the communication bus 90.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
an airbag inflatable to an inflated position;
a seat including a seat back;
a strap having a first end connected to the airbag and a second end connected to the seat back; and
an inflatable webbing having a first end fluidly connected to the airbag and a second end releasably connectable to the seat back.

2. The system of claim 1, further comprising an inflator in fluid communication with the inflatable webbing.

3. The system of claim 2, further comprising a buckle connected to the seat back and a tongue connected to the inflatable webbing and releasably connectable to the buckle, the buckle including a channel fluidly connecting the inflator to the inflatable webbing when the tongue is connected to the buckle.

4. The system of claim 3, wherein the inflatable webbing includes a sheath and a webbing tube disposed in the sheath, the webbing tube in fluid communication with the airbag, and a fill tube in fluid communication with the inflator, wherein the tongue includes a tongue channel, and, when the buckle is connected to the tongue, the fill tube, the channel of the buckle, the tongue channel, and the webbing tube form a continuous fluid channel from the inflator to the airbag.

5. The system of claim 1, wherein the seat back has an upper portion and a lower portion, and the strap is connected to the upper portion and the inflatable webbing is releasably connectable to the lower portion.

6. The system of claim 1, wherein the seat back has an upper portion, and the airbag extends above the upper portion of the seat back in the inflated position.

7. The system of claim 1, further comprising a vehicle floor, and wherein the seat includes a seat bottom and a shaft extending from the seat bottom to the vehicle floor, wherein the seat bottom is rotatable relative to the floor about the shaft.

8. The system of claim 1, further comprising a retractor connected to the seat back including a retractor shaft rotatable about a retractor axis, wherein the second end of the strap is fixed to the retractor shaft.

9. The system of claim 8, wherein the retractor includes a locking mechanism movable to a locked position, wherein the locking mechanism prevents rotation of the retractor shaft in the locked position.

10. The system of claim 1, wherein the seat back includes a slot and strap extends from the seat back to the airbag through the slot.

11. The system of claim 1, further comprising a second strap having a first end connected to the airbag and a second end connected to the seat back.

12. The system of claim 1, further comprising a second inflatable webbing fluidly connected to the airbag and releasably connectable to the seat back.

13. The system of claim 1, wherein the inflatable webbing includes a sheath and a webbing tube disposed in the sheath and inflatable to an inflated position, wherein the webbing tube extends from the sheath in the inflated position.

14. A restraint assembly, comprising:
an airbag inflatable to an inflated position;
a retractor including a retractor shaft rotatable about a retractor axis;
a strap having a first end connected to the airbag and a second end fixed to the retractor shaft; and
an inflatable webbing having a first end fluidly connected to the airbag and a second end releasably connectable to a seat back.

15. The assembly of claim 14, further comprising a tongue fixed to the inflatable webbing.

16. The assembly of claim 14, wherein the retractor includes a lockin mechanism movable to a locked position, wherein the locking mechanism prevents rotation of the retractor shaft in the locked position.

17. The assembly of claim 14, further comprising an inflator in fluid communication with the inflatable webbing.

18. The assembly of claim 17, further comprising a buckle connected to the seat back and a tongue connected to the inflatable webbing and releasably connectable to the buckle, the buckle including a channel fluidly connecting the inflator to the inflatable webbing when the tongue is connected to the buckle.

19. The assembly of claim 18, wherein the inflatable webbing includes a sheath and a webbing tube disposed in the sheath, the webbing tube in fluid communication with the airbag, and a fill tube in fluid communication with the inflator, wherein the tongue includes a tongue channel, and, when the buckle is connected to the tongue, the fill tube, the channel of the buckle, the tongue channel, and the webbing tube form a continuous fluid channel from the inflator to the airbag.

20. The assembly of claim 14, wherein the inflatable webbing includes a sheath and a webbing tube disposed in the sheath and inflatable to an inflated position, wherein the webbing tube extends from the sheath in the inflated position.

\* \* \* \* \*

UNITED STATES PATENT AND TRADEMARK OFFICE
CERTIFICATE OF CORRECTION

PATENT NO.         : 10,144,381 B2
APPLICATION NO.    : 15/397058
DATED              : December 4, 2018
INVENTOR(S)        : Mohammed Omar Faruque et al.

Page 1 of 1

It is certified that error appears in the above-identified patent and that said Letters Patent is hereby corrected as shown below:

In the Claims

Column 6, in Line 55, Claim 16 replace "includes a lockin" with -- includes a locking --.

Signed and Sealed this
Third Day of December, 2019

Andrei Iancu
*Director of the United States Patent and Trademark Office*